US011822704B2

(12) United States Patent
Hutter et al.

(10) Patent No.: US 11,822,704 B2
(45) Date of Patent: Nov. 21, 2023

(54) CONSTANT TIME SECURE ARITHMETIC-TO-BOOLEAN MASK CONVERSION

(71) Applicant: CRYPTOGRAPHY RESEARCH, INC., San Jose, CA (US)

(72) Inventors: Michael Hutter, Walnut Creek, CA (US); Michael Tunstall, Walnut Creek, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 247 days.

(21) Appl. No.: 17/290,027

(22) PCT Filed: Oct. 28, 2019

(86) PCT No.: PCT/US2019/058377
§ 371 (c)(1),
(2) Date: Apr. 29, 2021

(87) PCT Pub. No.: WO2020/092257
PCT Pub. Date: May 7, 2020

(65) Prior Publication Data
US 2021/0406406 A1    Dec. 30, 2021

Related U.S. Application Data

(60) Provisional application No. 62/751,931, filed on Oct. 29, 2018.

(51) Int. Cl.
*G06F 21/72* (2013.01)
*G06F 21/75* (2013.01)
*H04L 9/00* (2022.01)

(52) U.S. Cl.
CPC ............ *G06F 21/72* (2013.01); *G06F 21/755* (2017.08); *H04L 9/003* (2013.01)

(58) Field of Classification Search
None
See application file for complete search history.

(56) References Cited

U.S. PATENT DOCUMENTS

| 8,050,402 B2 | 11/2011 | Golic |
| 2005/0147243 A1* | 7/2005 | Baek .......................... G06F 7/00 380/28 |

(Continued)

FOREIGN PATENT DOCUMENTS

| FR | 2994608 | 9/2015 |
| WO | WO-2018-162115 A1 | 9/2018 |

OTHER PUBLICATIONS

EP Response filed on Jan. 30, 2023 in Response to the Extended European Search Report dated Jul. 4, 2022 and the Communication Pursuant to Rules 70(2) and 70a(2) EPC dated Jul. 21, 2022 for EP Appln. No. 19879643.5. 12 pages.

(Continued)

*Primary Examiner* — Michael Pyzocha
(74) *Attorney, Agent, or Firm* — Lowenstein Sandler LLP (57) ABSTRACT

A first arithmetic input share and a second arithmetic input share of an initial arithmetically-masked cryptographic value are received. A sequence of operations using the arithmetic input shares and a randomly generated number is performed, where a current operation in the sequence of operations generates a corresponding intermediate value that is used in a subsequent operation. At the end of the sequence of operations, a first Boolean output share and a second Boolean output share are generated. The arithmetic-to-Boolean mask conversion is independent of the input bit length.

20 Claims, 6 Drawing Sheets

(56) References Cited

U.S. PATENT DOCUMENTS

| | | | |
|---|---|---|---|
| 2011/0013767 A1* | 1/2011 | Kim | H04L 9/0618 |
| | | | 380/28 |
| 2015/0110266 A1* | 4/2015 | Debraize | H04L 9/3242 |
| | | | 380/30 |
| 2015/0172042 A1* | 6/2015 | Karroumi | H04L 9/0625 |
| | | | 380/28 |
| 2021/0157586 A1* | 5/2021 | Vigilant | H04L 9/002 |
| 2021/0165633 A1* | 6/2021 | Guilley | G06F 7/501 |

OTHER PUBLICATIONS

Coron J-S et al: "A New Algorithm for Switching from Arithmetic to Boolean Masking", Electronic Publishing, Artistic Imaging, and Digital Typography; [Lecture Notes in Computer Science, ISSN 0302-9743], Springer Verlag, DE, vol. 2779, Jan. 1, 2003, pp. 89-97, XP002340677, ISGN: 978-3-540-24128-7, Sections 2, 3. 9 pages.

EP Extended European Search Report dated Jul. 4, 2022 re: EP Appln. No. 19879643.5. 8 pages.

NeiBe, Olaf et al., "Switching Blinding with a View Towards IDEA", Jul. 8, 2004, Cryptographic Hardware and Embedded Systems—CHES 2004; [Lecture Notes in Computer Science; LNCS], Springer-Verlag, Berlin/Heidelberg, pp. 230-239, XP019009367, ISBN: 978-3-540-22666-6, Section 3, Algorithms 3.1, 3.2. 10 pages.

Blandine Debraize "Efficient and Provably Secure Methods for Switching from Arithmetic to Boolean Masking", E. Prouff and P. Schaumont (Eds.): CHES 2012, LNCS 7428, pp. 107-121, 2012.

Coron, Jean-Sebastien et al., "Conversion from Arithmetic to Boolean Masking With Logarithmic Complexity", Publication [online] 2015 [retrieved Dec. 26, 2019. Retrieved from the Internet: <URL:https://link.springer.com/chapter/10.1007/978-3-662-48116-5_7.pdf>; pp. 130-149. 20 Pages.

Goublin Louis "A sound method for switching between Boolean and arithmetic masking". In: Koç, Ç.K., Naccache, D., Paar, C. (eds.) CHES 2001. LNCS, vol. 2162, pp. 3-15. Springer, Heidelberg (2001).

Jean-Sebastien Coron et. al. "Conversion from Arithmetic to Boolean Masking with Logarithmic Complexity", University of Luxembourg, Mar. 2015 9054. 117-129. DOI 10.1007/978-3-662-48116-5_7.

Jovan et al., "Techniques for Random Masking in Hardware", IEEE Transactions on Circuits and Systems—I: Regular Papers, vol. 54, No. 2, Feb. 2007.

Neibe, Olaf et al., "Switching Blinding With a View Towards IDEA", Giescecke & Devrient Department of Cryptology, Publication [online]. 2004 [retrieved Dec. 26, 2019. Retrieved from the Internet: <URL:https://link.springer.com/content/pdf/10.1007%2F978-3-540-28632-4_17.pdf>, pp. 230-239. 38 pages.

Notification of Transmittal of the International Search Report and the Written Opinion of the International Searching Authority, or the Declaration dated Jan. 22, 2020 re: Int'l Appln. No. PCT/US2019/058377. 15 Pages.

\* cited by examiner

Algorithm 2: First-order statistical-moment secure arithmetic-to-Boolean mask conversion (additive).

Input: $x'' = x + r$, the mask $r$, a random integer $\gamma$, where $x, r, \gamma \in (\mathbb{Z}_2^k, \oplus, \wedge, \vee, +, -)$ Output: $x' = x \oplus r$ 1  $t \leftarrow x'' \vee 1;$
2  $u \leftarrow r \wedge 1;$
3  $u \leftarrow u \oplus \gamma;$
4  $v \leftarrow u \oplus t;$
5  $z \leftarrow v + \gamma;$
6  $z \leftarrow z \oplus v;$
7  $z \leftarrow z \oplus \gamma;$
8  $v \leftarrow x'' \wedge 1;$
9  $t \leftarrow x'' \oplus \gamma;$
10 $u \leftarrow v \wedge u;$
11 $u \leftarrow u \oplus 1;$
12 $t \leftarrow t + u;$
13 $t \leftarrow t \oplus z;$
14 $z \leftarrow t \oplus \gamma;$
15 $u \leftarrow z \oplus r;$
16 $u \leftarrow u - \gamma;$
17 $u \leftarrow u \oplus t;$
18 $t \leftarrow r \oplus \gamma;$
19 $z \leftarrow z - t;$
20 $v \leftarrow u \oplus z;$
21 $z \leftarrow v \wedge (2^k - 2);$
22 $z \leftarrow v \oplus z;$
    return $z$

FIG. 4

Algorithm 2: First-order statistical-moment secure arithmetic-to-Boolean mask conversion (subtractive).

Input: $x'' = x + r$, the mask $r$, a random integer $\gamma$, where
$x, r, \gamma \in (\mathbb{Z}_{2^k}, \oplus, \wedge, \vee, +, -)$

Output: $x' = x \oplus r$

1 $t \leftarrow x'' \wedge (2^k - 2)$;
2 $u \leftarrow r \wedge 1$;
3 $t \leftarrow t \oplus u$;
4 $v \leftarrow x'' \wedge 1$;
5 $z \leftarrow t \oplus \gamma$;
6 $z \leftarrow z - \gamma$;
7 $u \leftarrow u \oplus \gamma$;
8 $u \leftarrow u \oplus v$;
9 $z \leftarrow z \oplus t$;
10 $t \leftarrow t \oplus u$;
11 $t \leftarrow t - u$;
12 $t \leftarrow z \oplus t$;
13 $z \leftarrow t \oplus \gamma$;
14 $u \leftarrow z \oplus r$;
15 $u \leftarrow u + \gamma$;
16 $u \leftarrow u \oplus t$;
17 $t \leftarrow r \oplus \gamma$;
18 $z \leftarrow z + t$;
19 $u \leftarrow u \oplus z$;
20 $z \leftarrow u \wedge (2^k - 2)$;
21 $z \leftarrow v \oplus z$;
return $z$

CONSTANT TIME SECURE ARITHMETIC-TO-BOOLEAN MASK CONVERSION

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to securely converting an arithmetically masked value (also referred to as an initial cryptographic value) to a Boolean masked value (also referred to as a modified cryptographic value) for cryptographic operations. An integrated circuit may perform a cryptographic operation that may result in susceptibility of the integrated circuit to a side-channel attack where an attacker (e.g., an unauthorized entity) may obtain information as the cryptographic operation is performed. An example of a side-channel attack includes, but is not limited to, Differential Power Analysis (DPA) where the attacker who seeks to obtain a secret key used in the cryptographic operation may study the differences in power profile (i.e., power consumption pattern) of the integrated circuit as the cryptographic operation is performed. An attacker may be an unauthorized entity that may obtain the input (e.g., the secret key) to the cryptographic operation by analyzing power profile measurements of the integrated circuit over a period of time. Accordingly, when the sender transmits a ciphertext to a receiver by encrypting plaintext via a cryptographic operation, the attacker may be able to retrieve the secret key that is used to encrypt the plaintext to the ciphertext by observing the power profile of the integrated circuit as the cryptographic operation is performed to encrypt the plaintext into the ciphertext. For example, the attacker may uncover a cryptographic (e.g., secret or private) key that is used to encrypt the plaintext as the cryptographic operation is performed by the integrated circuit.

Masking may be used to obfuscate or hide the input to the cryptographic operation with random data and then the cryptographic operation may be performed with the masked input. Such masking may render the intermediate states or values of the cryptographic operation indistinguishable from random data (i.e., "blinded" by the mask) when an attacker of the integrated circuit observes power profile of the integrated circuit when performing the cryptographic operation. For example, the plaintext may be subject to a Boolean operation such as an exclusive- or (XOR) operation with a random number representing the mask before the cryptographic operation encodes the plaintext into the ciphertext. Alternatively, the plaintext may be subject to an arithmetic operation such as an addition operation with a number representing the mask before the cryptographic operation encodes the plaintext into ciphertext. As an example, for an input x, a Boolean masked value corresponding to the input x may be x' that represents (x⊕r) where r is a value representing the mask. On the other hand, for the input x, an arithmetically masked value x" may represent (x+r) where r is a value representing the mask.

Certain cryptographic operations may use both Boolean operations (e.g., XOR, AND, OR etc.) and arithmetic operations (e.g., additions, subtractions etc.) during the performance of the cryptographic operation with the masked values. The cryptographic operation may perform a first operation (or a first set of operations) based on arithmetically masked values and may subsequently perform a second operation (or a second set of operations) based on Boolean masked values. Thus, in order to perform the Boolean operation, the arithmetically masked values may need to be converted to Boolean masked values. The conversion between the arithmetically masked values to Boolean masked values ("A2B" mask conversion) may need to be secure so that the conversion does not result in some DPA leakage (e.g., the attacker identifying information from observable differences in power profile of the integrated circuit). The DPA leakage may result in an attacker being able to obtain the secret key (or secret-key dependent data) used in the cryptographic operation while performing the A2B mask conversion.

There are many solutions for converting a Boolean mask to an arithmetic mask, but comparatively fewer solutions for converting an arithmetic mask to a Boolean mask. Specifically, there exists a method for Boolean to arithmetic (B2A) mask conversion that runs in constant time, i.e., that requires fixed number of instructions, and hence the method is independent of the input bit-size. However, the existing arithmetic-to-Boolean (A2B) mask conversion approaches, based on a recursive method, depend on the input bit size. As such, the efficiency and security of A2B mask conversions is not independent of the bit length of the input word.

Aspects of the present disclosure address the above and other deficiencies by providing secure A2B mask conversion methods that run in constant time and are independent of input bit-size of the processing device that processes the fixed number of instructions for the A2B mask conversion. The conversion may be performed and may be implemented in an integrated circuit to prevent DPA leaks that allow an attacker to retrieve a secret-key dependent input to the cryptographic operation (e.g., the unmasked value). Furthermore, the conversion may be performed with a fewer number of operations. Thus, aspects of the present disclosure provide additional security to an integrated circuit performing a cryptographic operation as well as an increased efficiency in the performance (e.g., less computation time) of the cryptographic operation when an arithmetically masked value is to be converted to a Boolean masked value.

The disclosed method also achieves the A2B conversion in fewer computation steps or operations. The following table compares the present disclosure with currently existing A2B conversion methods, with the numbers in columns 3-6 representing the number of operations required for A2B conversion for certain input bit lengths.

TABLE 1

| A2B methods | Number of random numbers | 8 bits | 16 bits | 32 bits | 64 bits | Security | Precomputation required? |
|---|---|---|---|---|---|---|---|
| Original method by Goubin (2001) | 1 | 45 | 85 | 165 | 325 | Univariate. Higher-order moments | no |
| Look-up Table-based method with $2^4$ entries (2012) | 2 | 36 | 74 | 150 | 302 | Univariate. Higher-order moments | yes |
| Look-up Table-based method with $2^8$ entries (2012) | 2 | — | 36 | 74 | 150 | Univariate. Higher-order moments | yes |
| Adder-based method (2015) | 3 | 81 | 109 | 137 | 165 | Univariate Higher-order moments. | no |
| Present Disclosure's Method | 1 | 21 | 21 | 21 | 21 | Proven for univariate, first-order moment. | no |

The term "secure" mask conversion here encompasses secure operation against both univariate and multi-variate attacks. Attacks that make use of a single sample point in a power profile are known as univariate attacks. On the other hand, attacks that combine two or more sample points, e.g., by adding or multiplying them together, are known as multi-variate attacks.

As persons skilled in the art would appreciate, a "secure" operation that does not leak information at a lower order statistical moment, may become insecure. i.e., vulnerable when being attacked at higher order statistical moments. The A2B mask conversion methods disclosed herein are proven to be secure at least against univariate first-order statistical moment attacks. The methods could also be extended for multi-variate and/or higher-order secure implementations. Persons skilled in the art will appreciate that many practical instances require security only in the lower orders (e.g., first order), because exploitation of higher-order statistical moments is difficult for attackers due to increased noise levels.

An additional advantage of the method disclosed herein is that the method does not require "pre-computations," and hence no additional memory to store pre-computed intermediate values is needed. This feature sets the disclosed method apart from the existing "look-up table"-based methods. The method can be implemented in software or a combination of hardware and software. Persons skilled in the art would understand that implementing the algorithms described herein on an ideal computer ensures that the solution is leak-proof, i.e., every intermediate value of the solutions are statistically independent of the secret (unmasked) data. When implemented on a real computer, the possibility of information leakage theoretically increases. As such, additional hardware may be needed in the computer to counter the leakage.

As can be seen above, the present disclosure's method achieves the A2B conversion in fewer computational operations than the existing methods. Thus, the present disclosure's method is inherently more efficient.

Figure 1:
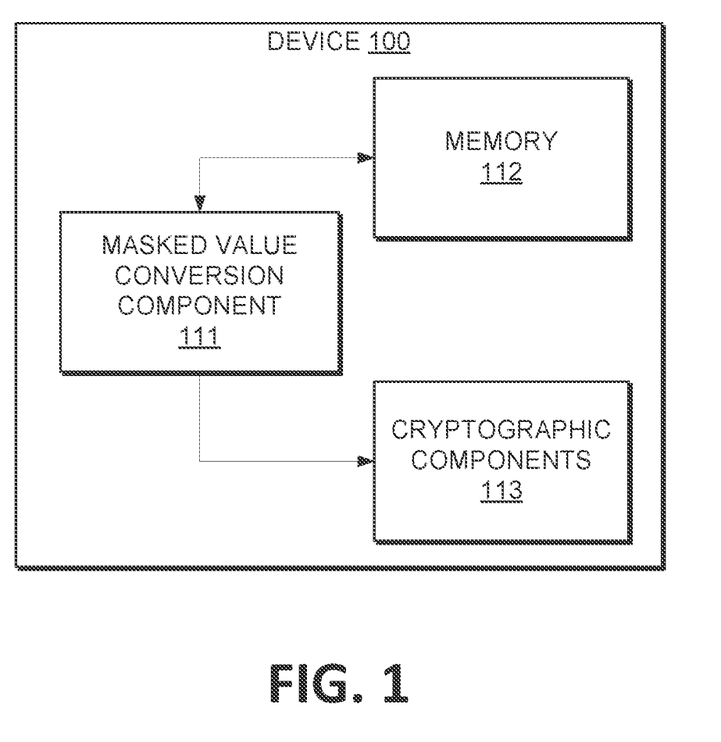
FIG. 1 illustrates an example device using a masked value conversion component for cryptographic operations in accordance with some embodiments.

FIG. 1 illustrates an example device including a masked value conversion component, in accordance with some aspects of the present disclosure. The device 100 may include an integrated circuit that is associated with a masked value conversion component 111, a memory 112, and cryptographic components 113. The masked value conversion component 111 of the integrated circuit may receive an arithmetically masked input value and may convert that to a Boolean masked input value for use in a cryptographic operation performed by the cryptographic components 113.

As shown in FIG. 1, the device 100 may include a masked value conversion component 111 that may perform A2B mask conversion or B2A mask conversion. The masked value component 111 may further receive randomly generated numbers. For example, in some embodiments, the memory 112 may be used to store the randomly generated numbers that are generated by a random number generation component and the stored random numbers may be retrieved by the masked value conversion component 111. In the same or alternative embodiments, the masked value conversion component 111 may receive the random numbers from the random number generation component without the random numbers being stored at the memory 112. The cryptographic components 113 may subsequently use the masked input value in a cryptographic operation. Examples of such cryptographic operations include, but are not limited to, generating a digital signature to authenticate the device 100 or a component of the device 100, encrypting or decrypting data, hashing messages, etc. Furthermore, the cryptographic components 113 may perform a cryptographic operation based on the masked input value. Examples of such cryptographic operations may be based on, but are not limited to, Secure Hash Algorithm (SHA)-1, SHA-2, the stream cipher families Salsa and ChaCha, International Data Encryption Algorithm (IDEA), Rivest Cipher 6 (RC6), Extended Tiny Encryption Algorithm (XTEA), etc.

The cryptographic components 113 may perform a cryptographic operation. The cryptographic operation may at some point switch from arithmetic operations to Boolean operations. Since the part of the cryptographic operation that is based on the arithmetic operations produces arithmetically-masked values, that masked value may first need to be converted to Boolean masked values so that further Boolean operations may then be performed. Further details with regard to converting an arithmetically masked input value to a Boolean masked input value are described in conjunction with FIG. 3.

Figure 2:
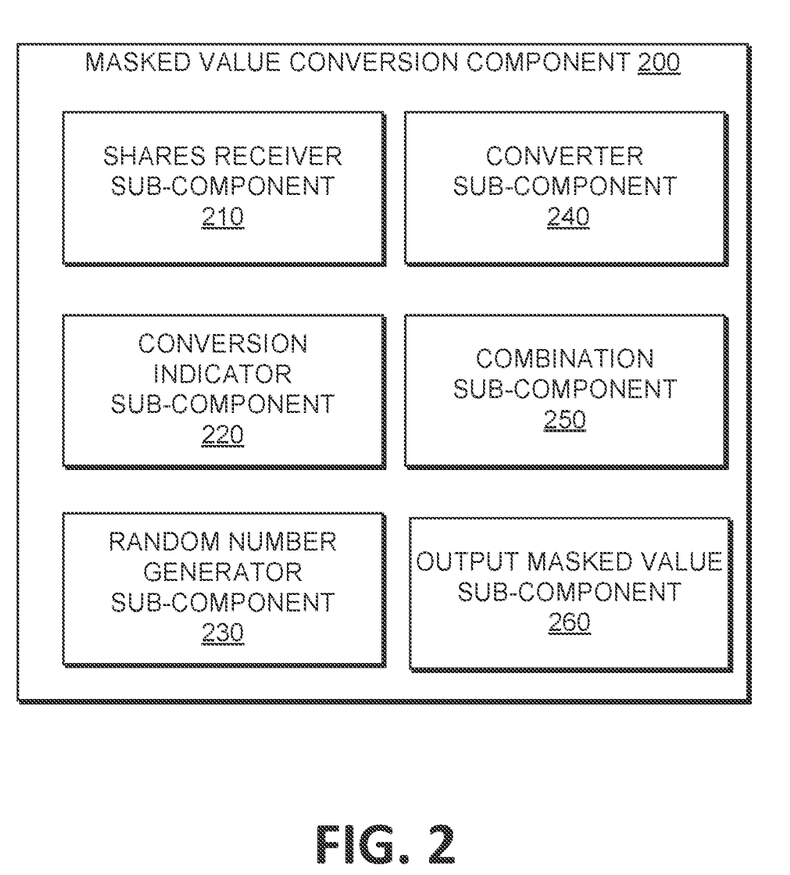
FIG. 2 is a block diagram of a masked value conversion component to provide a conversion from a Boolean masked value to an arithmetically masked value and an arithmetically masked value to a Boolean masked value, respectively, for cryptographic operations in accordance with some embodiments.

FIG. 2 is a block diagram of a masked value conversion component 200 to convert an arithmetically masked input value to a Boolean masked input value, in accordance with some aspects of the present disclosure. The masked value conversion component 200 may correspond to the masked value conversion component 111 of FIG. 1. Furthermore, the masked value conversion component 200 may be implemented by or in processing logic that may include hardware (e.g., processing device, circuitry, dedicated logic, programmable logic, microcode, integrated circuit, hardware of a device, etc.), software (e.g., instructions run or executed on a processing device), or a combination thereof. In some embodiments, the masked value conversion component 200 may include a shares receiver sub-component 210, a conversion indicator sub-component 220, a random number generator sub-component 230, a converter sub-component 240, a combination sub-component 250, and an output masked value sub-component 260. In alternative embodiments, the functionality of one or more of the sub-components may be combined or divided.

As shown in FIG. 2, the masked value conversion component 200 may include a shares receiver sub-component 210 that may receive shares corresponding to a masked input value. For an arithmetic operation, the shares are arithmetic shares. For a Boolean operation, the shares are Boolean shares. Shares can be input shares, shares for an intermediate value, and/or output shares. The masked value conversion component 200 may receive two or more shares that correspond to the masked input value. For example, an underlying secret value 'x' may be masked by combining the value 'x' with a mask value 'r'. The combination of the value 'x' with the mask value may be the first share. The mask value itself may be the second share. Additional random numbers may be added to the original value already masked with the first mask value 'r'.

The masked value conversion component 200 may further include a conversion indicator sub-component 220 that may receive an indication that a cryptographic component, which has been performing a cryptographic operation based on an arithmetic operation, is now performing or is about to perform the cryptographic operation based on a Boolean operation. In response to receiving the indication, the shares receiver sub-component 210 may receive the input shares from another component or a memory of a device that includes the masked value conversion component 200. The random number generator sub-component 230 may generate random numbers for use in the A2B conversion.

Furthermore, the converter sub-component 240 may perform an arithmetic to Boolean operation by converting one or more of the received shares. The combination sub-component 250 may combine multiple values (e.g., input shares in their original arithmetic form, input shares after A2B conversion, and randomly generated numbers) to generate output shares. As non-limiting illustrative examples, the combination sub-component 250 may perform an arithmetic addition operation, a Boolean XOR operation, and/or an arithmetic subtraction operation to ultimately generate at least two Boolean output shares at the end of a sequence of operations. Note that shares for an intermediate value may be in either arithmetic or Boolean form. The output masked value sub-component 260 receives the final Boolean output shares from the combination sub-component 250 and generates an output masked value (Boolean) using those final Boolean output shares. The final output masked value can be provided to a cryptographic component performing further cryptographic operations on the final output masked value.

Figure 3:
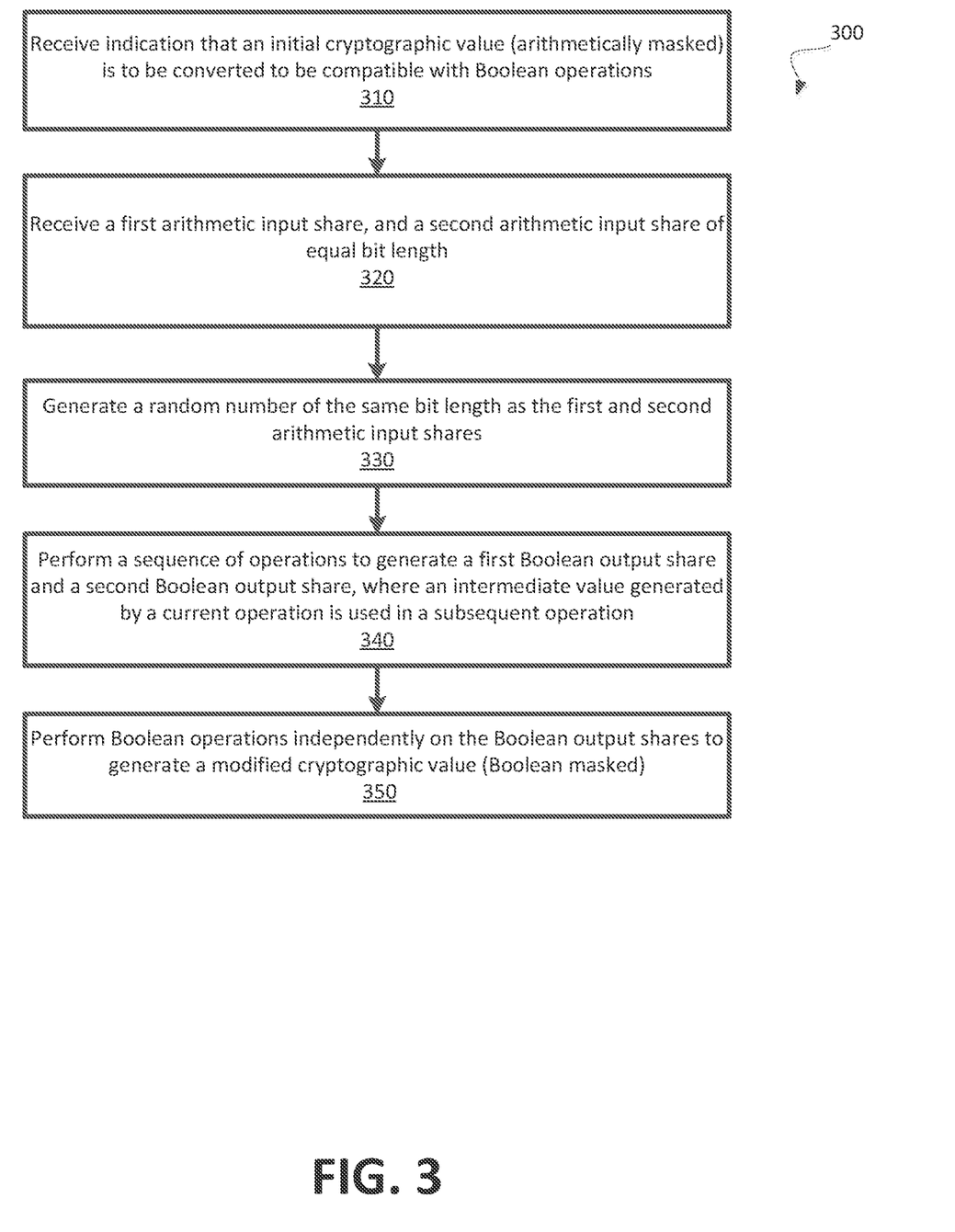
FIG. 3 is a flow diagram of an example method to perform a conversion of an arithmetically masked value to the Boolean masked value for cryptographic operations in accordance with some embodiments of the present disclosure.

FIG. 3 is a flow diagram of an example method 300 to perform a conversion of an arithmetically masked value to a Boolean masked value for cryptographic operations. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the masked value conversion component 111 of FIG. 1 or the masked value conversion component 200 of FIG. 2.

Referring back to FIG. 3, method 300 begins at block 310, where an indication is received (for example, at conversion indicator sub-component 220) that an initial cryptographic value (i.e., an underlying secret value that is masked) created using an arithmetic operation is to be converted into a modified cryptographic value that is compatible with Boolean operations. This would typically be part of a procedure and, hence, a sub-function is called as part of a larger operation. That is, the sub-function A2B is called when we need to change from using arithmetic operations to using Boolean operations, depending on the underlying cryptographic primitive. For example, the initial cryptographic value may be $x''=(x+r)$, wherein the modified cryptographic value may be $x'=(x \oplus r)$, where x is the underlying secret value, and r is the mask.

At block 320, a first arithmetic input share, and a second arithmetic input share are received for example, at shares receiver sub-component 210, at some point during an ongoing cryptographic operation. It is to be noted that a combination of the first and the second arithmetic input shares generates the initial cryptographic value. Each of the first and the second arithmetic input shares have a bit length equal to a bit length of the initial cryptographic value.

At block 330, a random number is generated (for example at the random number generator 230), whose bit length is the same as the bit length of the first and the second arithmetic input shares.

Figure 4:
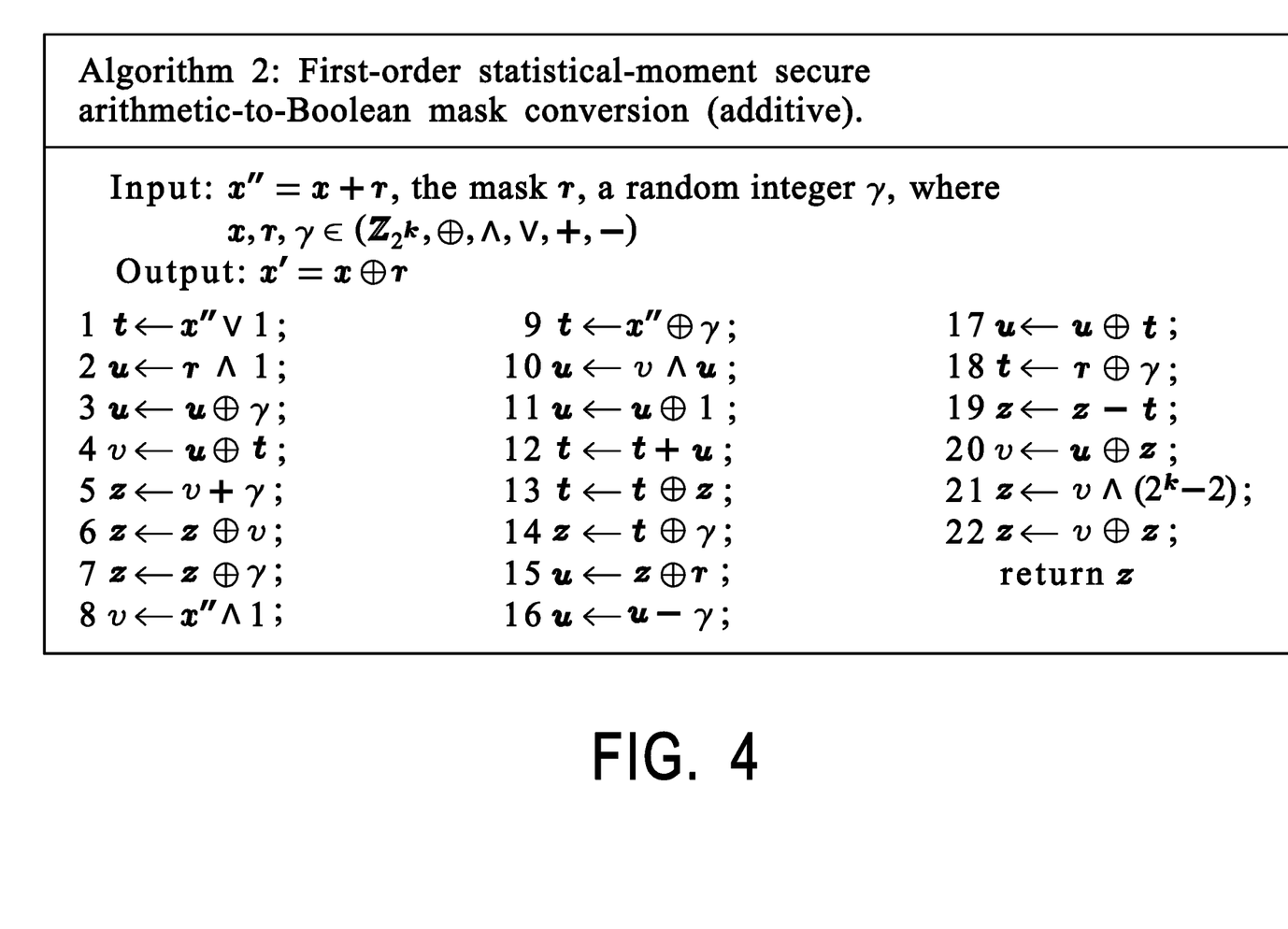
FIG. 4 illustrates a series of operations to perform the conversion of the arithmetically masked value to the Boolean masked value in an additive manner for cryptographic operations in accordance with some embodiments of the present disclosure.
Figure 5:
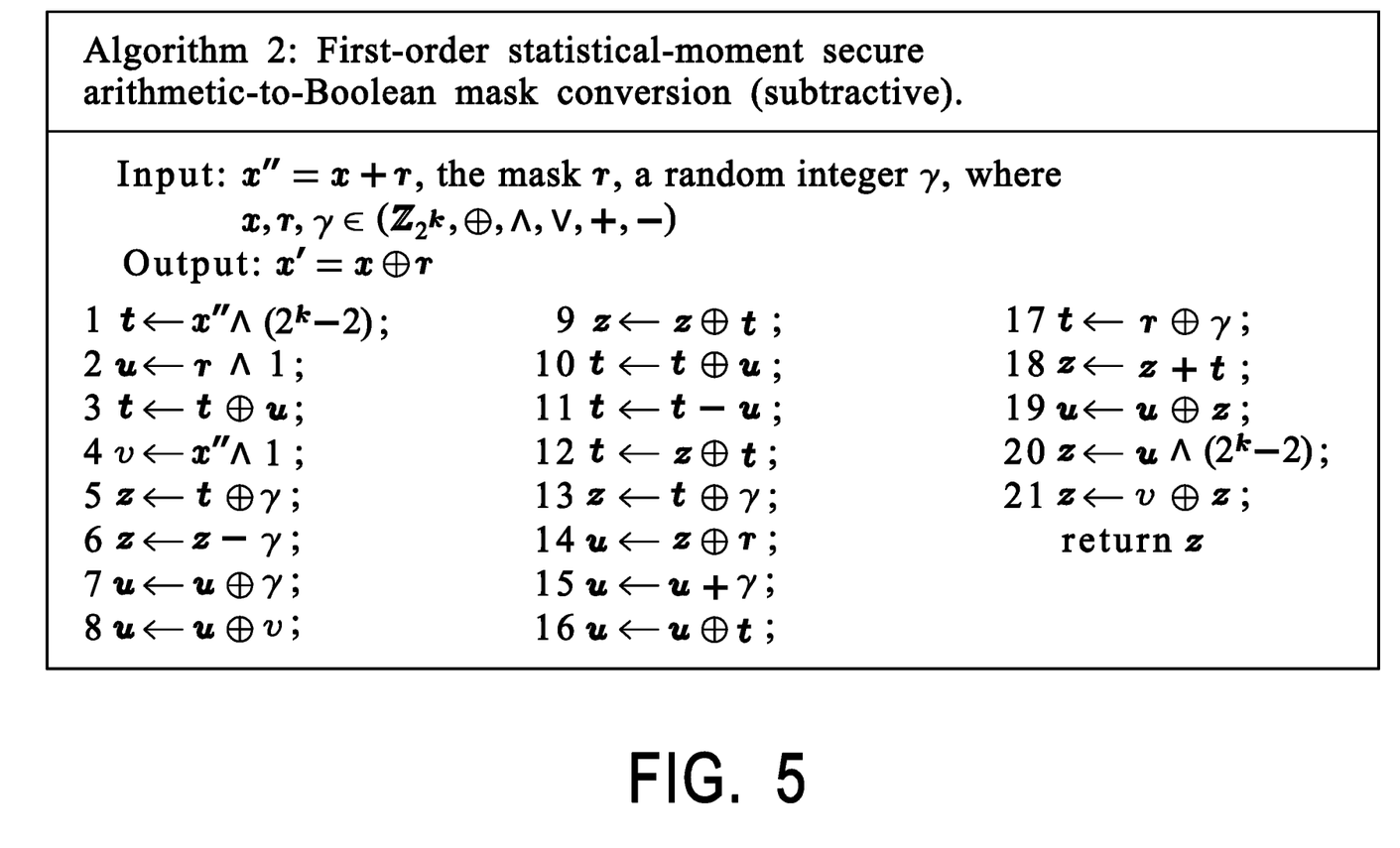
FIG. 5 illustrates another series of operations to perform the conversion of the arithmetically masked value to the Boolean masked value in a subtractive manner for cryptographic operations in accordance with some embodiments of the present disclosure.

At block 340, a sequence of operations is performed using the arithmetic input shares and the random number. A first Boolean output share and a second Boolean output share are generated at the end of the sequence of operations performed at block 340. These operations may be performed in the converter sub-component 240, as well as in the combination sub-component 250. Example sequences of operations are shown in FIGS. 4 and 5. A current operation in the sequence of operations generates a corresponding intermediate value (as shown in FIGS. 4 and 5) that is used in a subsequent operation in the sequence of operations. During the sequence of operations disclosed herein, each of the intermediate values or any combination of intermediate values is statistically independent of the underlying secret value. Therefore, no direct-value leak is expected.

At block 350, Boolean operations (such as an XOR operation) are performed independently on the first Boolean output share and the second Boolean output share (received from block 340) to create the modified cryptographic value. For example, the modified cryptographic value may be y'=x'⊕u, where u is another Boolean masked cryptographic value. The two shares of the modified cryptographic value are then y' and u. This operation may be performed at the output masked value sub-component 260.

In some embodiments, A2B mask conversion may be performed in an additive manner by a sequence of operations as illustrated with respect to FIG. 4. For example, the sequence of operations may include 22 computational operations. In alternative embodiments, A2B mask conversion may be performed in a subtractive manner by a sequence of operations as illustrated with respect to FIG. 5. As seen in the FIG. 5, the fastest algorithm needs only 21 instructions, i.e., output Boolean shares are generated in 21 steps. As shown in Table 1 above, all the existing A2B conversion methods require many more than 21 steps.

As mentioned above, aspects of this disclosure enable A2B mask conversion in constant time, i.e., the A2B mask conversion is done using a fixed number of instructions. The advantage of constant-time operation is that the A2B conversion is independent of input bit length. The input bit length can be arbitrary. Non-limiting examples of input bit length are one word or a few words, depending on the microprocessor used, e.g., 32 bits or 64 bits.

As persons skilled in the art would appreciate, an efficient way for a B2A mask conversion is to exploit the linearity of the following generic affine function $\Phi$ (a,b)→((a⊕b)+b), where a and b are two variables. In the present case, x'=(x⊕r) is a Boolean-masked representation of a secret input value x', and x"=(x+r) is the arithmetically masked representation of the secret input value, with r being the mask.

Typically, a B2A conversion works as follows:

$$x'' = x' \oplus \Phi(x', \gamma) \oplus \Phi(x', \gamma \oplus r)$$
$$= x' \oplus ((x' \oplus \gamma) + \gamma) \oplus ((x' \oplus (\gamma \oplus r)) + (\gamma \oplus r))$$

Here, $\gamma$ is an additional random value to mask the B2A conversion. This additional random value may be generated, for example, at block 330 in method 300.

The conversion can be inverted as follows:

$$x \oplus r = x'' \oplus ((x'' \oplus \gamma \oplus r) - \gamma) \oplus ((x'' \oplus \gamma) - (\gamma \oplus r))$$
$$= x'' \oplus \overline{\Phi}(x'' \oplus r, \gamma) \oplus \overline{\Phi}(x'' \oplus r, \gamma \oplus r)$$

Here, $\overline{\Phi}$ is the complement of affine function $\Phi$.

The two inner terms of the above equation, however, reveal information about the underlying secret value 'x', i.e., leak information to an attacker during A2B conversion. For example, consider the first inner term:

$$((x'' \oplus \gamma \oplus r) - \gamma) = ((x \oplus r \oplus c_r) \oplus \gamma \oplus r) - \gamma$$
$$= ((x \oplus c_r) \oplus \gamma) - \gamma$$
$$= x \oplus c_r \oplus b_\gamma$$

Here, $c_r$ is the carry vector, i.e., all carry bits, produced by the addition of x and r, and, $b_\gamma$ is the borrow vector, i.e., all borrow bits, produced by the subtraction of x and r.

The first inner term becomes zero if x=0. This is known as the zero-value problem, which runs the risk of leaking information for x=0, because the outcome of certain operations involving x=0 will always be zero, and the propagation of the zero is visible to a potential attacker. If x≠0, then x does not leak information at least in the first-order statistical moment. Additional operations prior to and subsequent to the sequence of operations are performed to make the conversion first-order secure against the zero-value problem. For example, x may be chosen to be odd when the arithmetically masked value is (x+r), and x may be chosen to be even when the arithmetically masked value is (x−r).

The zero-value problem at first-order for x=0 may be solved by guaranteeing that x is odd only. To ensure x is odd, the least significant bit (LSB) of x" is fixed to be 1 without changing the value of mask 'r'. This can be done by calculating the following:

$$x''_{odd} = (x''|1) \oplus (r\ \&1)$$

The mask is then corrected by performing a secure B2A operation to add the complement of the LSB of x to $x''_{odd}$. The complement of the LSB of x is expressed as (x"[0]⊕r[0]⊕1).

After the mask correction, a secure A2B conversion is performed by a sequence of operations (as shown in FIGS. 4 and 5). The result of the A2B conversion is corrected further by replacing the LSB of the output of the final operation with the LSB of x" (note that the LSB of x' and x" is the same). By doing these additional steps of mask correction, the A2B mask conversion method of this disclosure is ensured to be secure against first-order univariate attacks.

Figure 6:
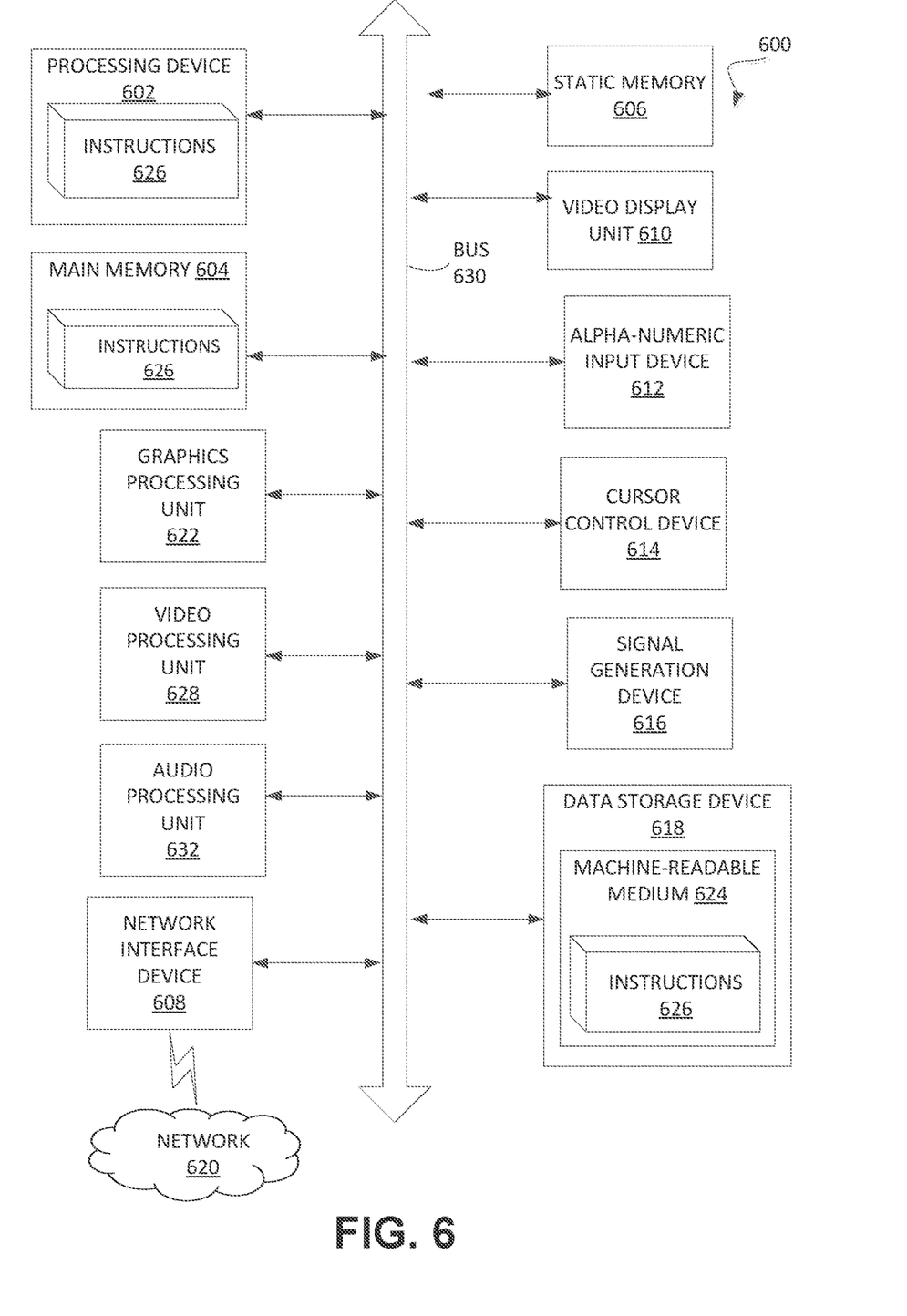
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a masked value conversion component (e.g., masked value conversion component 111 of FIG. 1 or masked value conversion component 200 of FIG. 2). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising:
   receiving an indication that an initial cryptographic value created using an arithmetic operation is to be converted into a modified cryptographic value that is compatible with Boolean operations, wherein the initial cryptographic value comprises an underlying secret value that is arithmetically masked using a first random number as a mask;
   receiving a first arithmetic input share and a second arithmetic input share of the initial cryptographic value, wherein each of the first and the second arithmetic input shares has a bit length equal to a bit length of the initial cryptographic value;
   generating a second random number whose bit length is the same as the bit length of each of the first and the second arithmetic input shares;
   performing a sequence of operations using the arithmetic input shares and the second random number to generate a first Boolean output share and a second Boolean output share at the end of the sequence of operations, wherein a current operation in the sequence of operations generates a corresponding intermediate value that is used in a subsequent operation in the sequence of operations; and
   performing the Boolean operations on both the first Boolean output share and the second Boolean output share independently to create the modified cryptographic value that is Boolean masked.

2. The method of claim 1, wherein the initial cryptographic value is obtained by arithmetically adding the first random number 'r' with the underlying secret value 'x'.

3. The method of claim 2, further comprising:
   prior to performing the sequence of operations, fixing a least significant bit of the initial cryptographic value to be 1 to ensure that both the initial cryptographic value and the underlying secret value 'x' are odd irrespective of a value of the first random number 'r'.

4. The method of claim 3, further comprising:
   prior to performing the sequence of operations, correcting the first random number 'r' by adding a complement of a least significant bit of the underlying secret value to the initial cryptographic value.

5. The method of claim 4, further comprising:
   after performing the sequence of operations, correcting a result of a final operation of the sequence of operations by replacing a least significant bit of an output value of the final operation with a least significant bit of the initial cryptographic value.

6. The method of claim 1, wherein the initial cryptographic value is obtained by arithmetically subtracting the first random number 'r' from the underlying secret value 'x'.

7. The method of claim 6, further comprising:
   prior to performing the sequence of operations, selecting an even value for the underlying secret value 'x'.

8. The method of claim 1, wherein performing the Boolean operation comprises:
   performing XOR operations independently on the first Boolean output share and the second Boolean output share to create the modified cryptographic value that is Boolean masked.

9. The method of claim 1, wherein a number of operations in the sequence of operations is independent of the bit length of the first and the second arithmetic input shares.

10. The method of claim 1, wherein the bit length of the first and the second arithmetic input shares is one or more words.

11. The method of claim 1, wherein each of the intermediate values or any combination of intermediate values is statistically independent of the underlying secret value.

12. The method of claim 1, wherein none of the operations in the sequence of operations requires any pre-computation.

13. The method of claim 1, wherein each of the operations in the sequence of operations has a same bit length as other operations in the sequence of operations, irrespective of whether the operation is performed on arithmetic intermediate values or Boolean intermediate values.

14. A system comprising:
    a memory; and
    a computer processor operatively coupled with the memory, to:
    receive an indication that an initial cryptographic value created using an arithmetic operation is to be converted into a modified cryptographic value that is compatible with Boolean operations, wherein the initial cryptographic value comprises an underlying secret value that is arithmetically masked using a first random number as a mask;
    receive a first arithmetic input share, and a second arithmetic input share of the initial cryptographic value, wherein both the first and the second arithmetic input shares have a bit length equal to a bit length of the initial cryptographic value;
    generate a second random number whose bit length is the same as the bit length of the first and the second arithmetic input shares;
    perform a sequence of operations using the arithmetic input shares and the second random number to generate a first Boolean output share and a second Boolean output share at the end of the sequence of operations, wherein a current operation in the sequence of operations generates a corresponding intermediate value that is used in a subsequent operation in the sequence of operations; and
    perform the Boolean operations on both the first Boolean output share and the second Boolean output share independently to create the modified cryptographic value that is Boolean masked.

15. The system of claim 14, wherein the initial cryptographic value is obtained by arithmetically adding the first random number with the underlying secret value.

16. The system of claim 15, wherein the underlying secret value is odd.

17. The system of claim 14, wherein the initial cryptographic value is obtained by arithmetically subtracting the first random number from the underlying secret value.

18. The system of claim 17, wherein the underlying secret value is even.

19. The system of claim 14, wherein the Boolean operations the processing device performs are XOR operations performed independently on the first Boolean output share and the second Boolean output share to create the modified cryptographic value that is Boolean masked.

20. The system of claim 14, wherein a number of operations in the sequence of operations is independent of the bit length of the first and the second arithmetic input shares.

* * * * *